United States Patent
Trapp

[11] 3,768,138
[45] Oct. 30, 1973

[54] BRAKE CABLE PULLER

[76] Inventor: John A. Trapp, 2531 Leslie, Detroit, Mich. 48238

[22] Filed: Mar. 23, 1972

[21] Appl. No.: 237,376

[52] U.S. Cl............................ 29/270, 7/4, 81/425 R
[51] Int. Cl............................................. B25b 27/00
[58] Field of Search ...................... 29/268, 270; 7/4; 81/425

[56] References Cited
UNITED STATES PATENTS
317,318   5/1885   Davis ......................................... 7/4

FOREIGN PATENTS OR APPLICATIONS
387,740   7/1908   France ................................. 81/425

Primary Examiner—Othell M. Simpson
Assistant Examiner—Harold P. Smith, Jr.
Attorney—Edward M. Apple

[57] ABSTRACT

A tool for removing a brake cable from the brake lever and brake flange of a motor vehicle. The tool has two components, each of which is arcuate at one end, and has fingers which cooperate for compressing the expanded prongs of the stop member, which holds one end of the cable to the flange, one of said components having a V-shaped member at the opposite end, with serrations in the V, for gripping the cable; whereby, to remove it from the brake lever.

2 Claims, 5 Drawing Figures

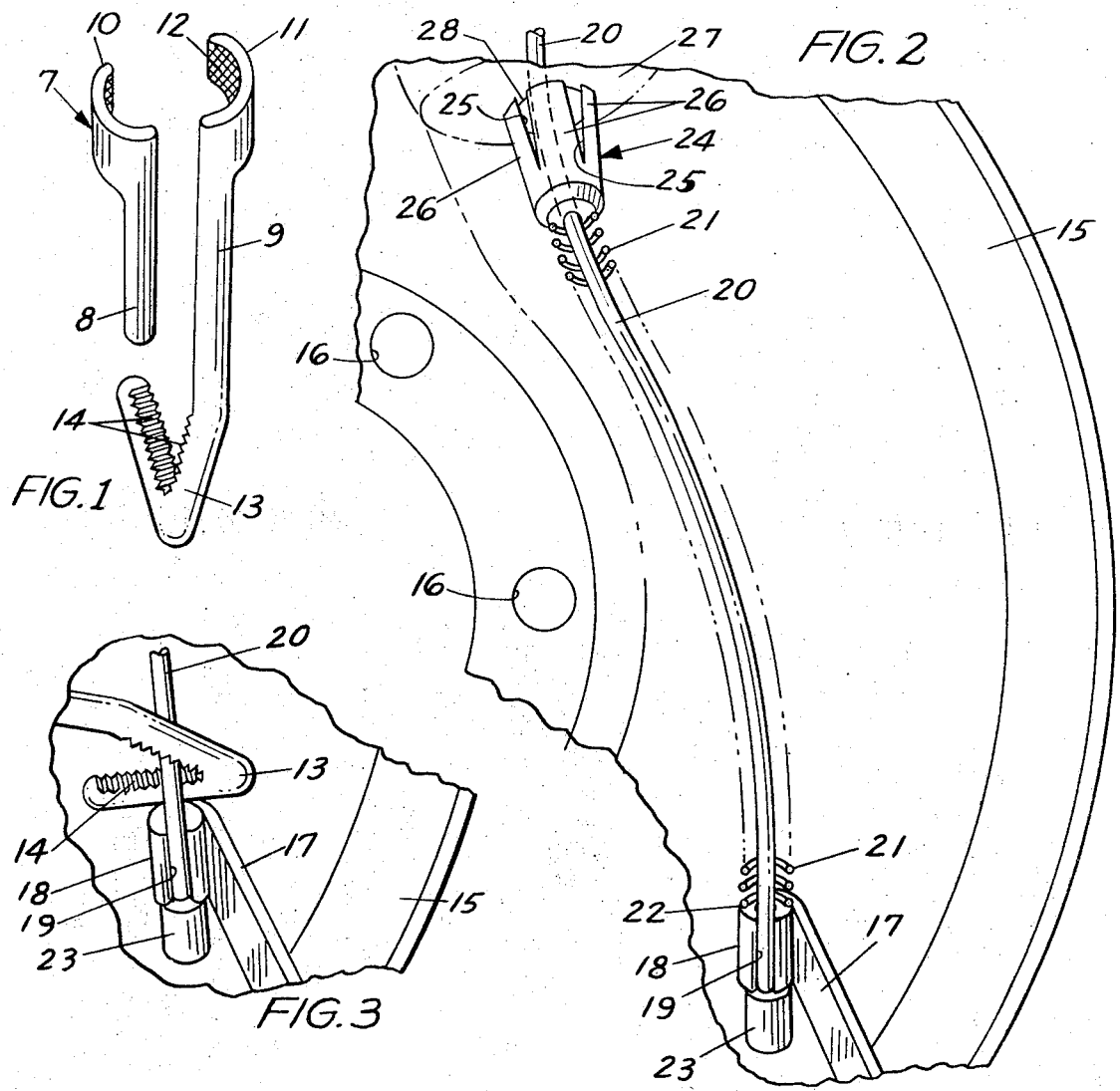
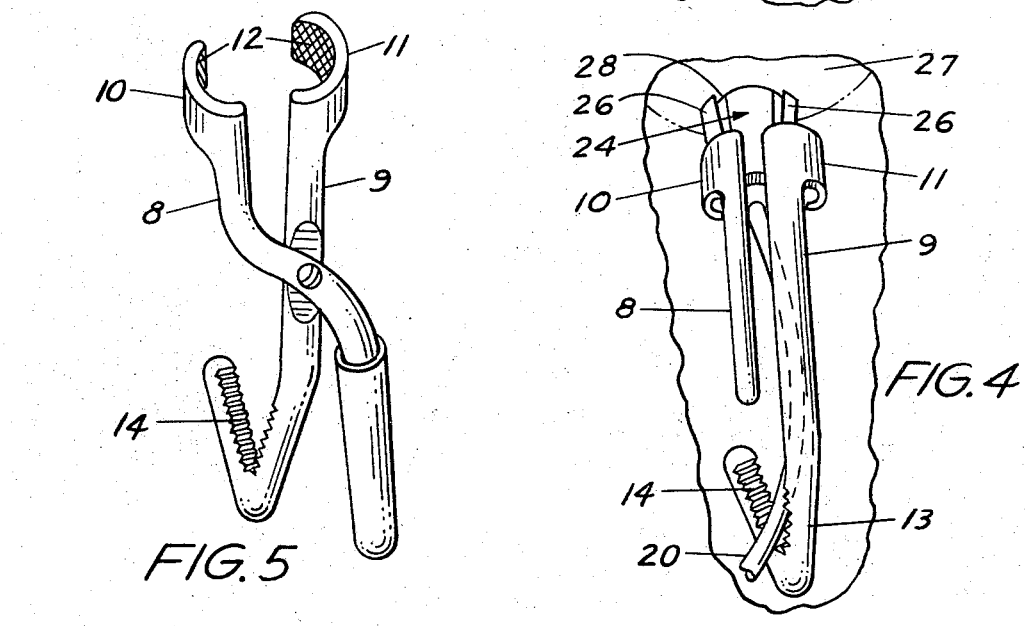

BRAKE CABLE PULLER

This invention relates to hand tools for use by an automobile mechanic, and has particular reference to a tool for removing a brake cable from the brake flange and brake lever of the vehicle.

Some types of motor vehicles are equipped with brake cables, which are sheathed in coil springs, which springs are provided at each end with terminal members; one of which locks the cable assembly in a slot formed in the brake lever, the other terminal member has a tunnel to permit the cable to slide therein, and extend through an opening formed in the brake flange. The last named terminal member is also provided with a plurality of springable prongs, the ends of which abut the inside face of the flange, to prevent the assembly from inadvertantly being pulled through the opening in the flange. When these parts are once assembled, it is very difficult to disassemble them.

It is therefore an object of this invention to obviate the foregoing difficulties and to provide a tool, the use of which makes the disassembling a minor operation.

Another object of the invention is to provide a hand tool, for the purpose indicated, which is simple in construction, economical to manufacture, and efficient in operation.

Another object of the invention is to provide a tool for removing a brake cable, without the necessity of removing the brake lever or brake flange.

The foregoing and other objects and advantages of the invention will become more apparent as the description proceeds, reference being made from time to time to the accompanying drawing, forming part of the within disclosure, in which drawing:

FIG. 1 is a perspective view of a device embodying the invention.

FIG. 2 is an enlarged, fragmentary, perspective view, illustrating a brake flange and brake lever, with a brake cable assembly attached thereto.

FIG. 3 is a fragmentary detail, illustrating how the V-shaped end of the tool is used to grasp the cable, to remove it from the slot cut in the rounded end of the brake lever.

FIG. 4 is a schematic view, illustrating the manner in which the two ends of the tool are used respectively; first, to remove the brake cable from the slot in the brake lever, and; secondly, to squeeze together the prongs so that the cable assembly may be pulled through the opening in the brake flange.

FIG. 5 is a modified form of the tool, in which the two parts of the tool are pivoted together, in the manner of a pair of pliers.

Referring now more particularly to the drawing, it will be understood that the embodiment herein disclosed, the reference character 7, indicates, in general, the tool embodying the invention. The tool consists of cooperating members 8 and 9, each of which has an arcuate end 10 and 11, the inside faces of which are knurled as at 12. The opposite end of the member 9 terminates in a V-shaped element 13, the inside faces of the V- being provided with serrations 14, for firmly gripping a cable, as herein after described.

In FIG. 2, I illustrate a conventional brake flange 15, which is provided with openings 16, for receiving bolts or threaded studs; whereby, the flange 15 is secured to an axle housing. The reference character 17 (FIG. 2) indicates the vehicle brake lever, which has a rolled end portion 18, in which is machined, or otherwise formed, a slot 19, for receiving a brake cable 20.

The cable 20 is sheathed in a spring 21. The end 22 of the spring 21 abuts one side of the rolled portion 18, of the brake lever. An end member 23, which is welded, or otherwise secured, to the end of the cable 20, abuts the opposite side of the rolled portion 18, of the brake lever. The tension of the spring 21 on one side of the rolled member 18, and the end member 23, hold the cable 20 in the slot 19.

The opposite end of the spring 21, has secured to it, by welding or other suitable means, a terminal member 24, through which the cable 30 slides. The member 23 is slotted as at 25, to form a plurality of spring fingers, or prongs 26, the free ends of which abut the face 27 of the flange 15 to normally prevent the displacement of the spring assembly from the flange. The flange 15 is provided with a hole 28, through which the cable 20 extends.

In order to pull the cable and the spring assembly through the opening 28 in the flange, the upper ends 10 & 11 of the tool are used to compress the spring fingers, or prongs 26. In order to pull the cable and spring assembly through the opening 28 in the flange, it is first necessary to remove the opposite end of the cable 20 from the slot 19, formed in the brake lever 17. This is done by compressing the end of the spring 22 away from the rolled member 18, of the lever 17; so that the V-shaped end 13 of the tool may be received around the cable 20, as shown in FIG. 4. The cable 20 is then pulled out of slot 19, to free one end of the assembly. When the spring fingers, or prongs, 26 are compressed, the whole assembly—including the cable 20, the spring 21, and the terminal ends 23 and 24—may readily pulled through the opening 28, in the flange to free the brake cable assembly.

It is believed that the operation of the device is obvious from the foregoing description.

Having described my invention, what I claim and desire to secure by Letters Patent is:

1. A tool for removing a brake cable assembly from the brake lever and brake flange of a vehicle, consisting of a pair of elongated members, each having a different length and each having a wide arcuate element at one end, the radii of the arcs lying in a plane, perpendicular to the longitudinal axes of the said members, said arcuate elements being offset with respect to the longitudinal axis of the members, said arcuate elements being adapted to encircle the brake cable assembly and compress the spring fingers comprising part of said brake cable assembly to a diameter small enough to permit said brake cable assembly to be withdrawn through the conventional opening provided for it in said flange, the longest of said elongated members having a deep V-shaped serrated portion at the end opposite said arcuate elements, adapted to receive the cable of said cable assembly, whereby said cable may be pulled from the conventional retainer provided for it on said brake lever.

2. The structure of claim 1, in which one of said elongated members are is substantially S-shaped curved and said members are pivotally connected to one another.

* * * * *